United States Patent [19]

Dezael et al.

[11] 4,146,579

[45] Mar. 27, 1979

[54] PROCESS FOR CONVERTING SULFITIC SOLUTIONS BY MEANS OF AMMONIUM BISULFATE WITH SO₂ PRODUCTION

[75] Inventors: Claude Dezael, Maisons Laffitte; Sigismond Franckowiak, Rueil Malmaison; Henri Gruhier, Chatillon, Bagneux, all of France

[73] Assignee: Institut Francais du Petrole, Rueil Malmaison, France

[21] Appl. No.: 840,947

[22] Filed: Oct. 11, 1977

[30] Foreign Application Priority Data

Oct. 8, 1976 [FR] France .................................. 76 30545

[51] Int. Cl.² ............................................ C01B 17/50
[52] U.S. Cl. ................................................ 423/541 A
[58] Field of Search .................. 423/541 A, 549, 541, 423/520, 356, 242

[56] References Cited

U.S. PATENT DOCUMENTS

| | | | |
|---|---|---|---|
| 2,405,747 | 8/1946 | Hixson et al. | 423/541 A |
| 3,676,059 | 7/1972 | Welty, Jr. | 423/547 |
| 3,880,983 | 4/1975 | Welty, Jr. et al. | 423/541 |

*Primary Examiner*—O. R. Vertiz
*Assistant Examiner*—Wayne A. Langel
*Attorney, Agent, or Firm*—Millen & White

[57] ABSTRACT

This process avoids the disadvantages of admixing hot molten ammonium bisulfate with ammonium sulfites solutions. Overflowing hot molten ammonium bisulfate is admixed with a stream of aqueous ammonium bisulfate solution, said solution being preferably circulated in a closed loop. A portion of the resulting solution is then used to acidify the ammonium sulfites solution.

8 Claims, 1 Drawing Figure

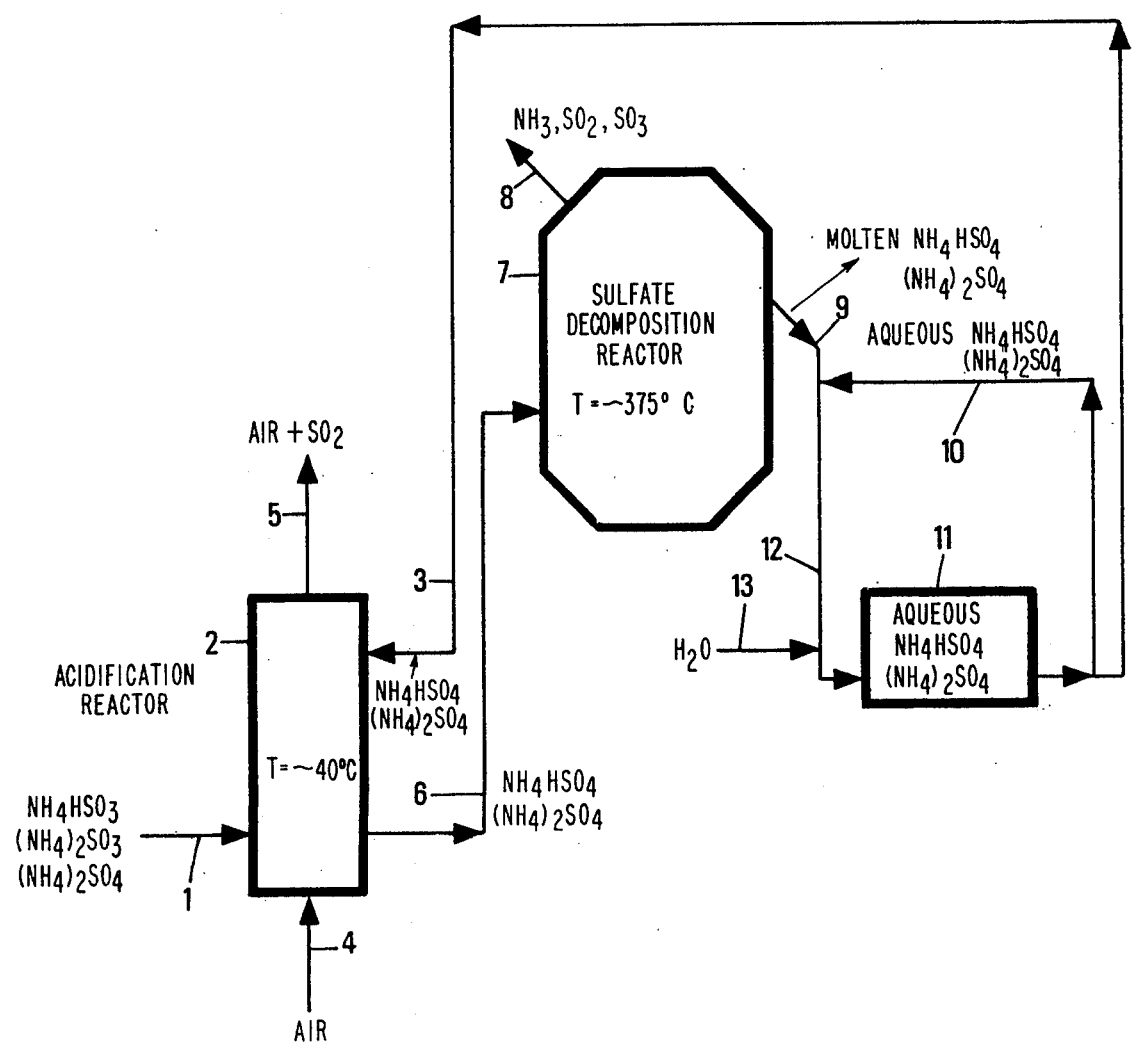

PROCESS FOR CONVERTING SULFITIC SOLUTIONS BY MEANS OF AMMONIUM BISULFATE WITH SO₂ PRODUCTION

The purification of a sulfur dioxide containing gas, by washing with an aqueous ammonia solution, results in the production of salt solutions (brines) containing ammonium sulfite and bisulfite, and also ammonium sulfate due to the presence, in addition to the sulfur dioxide of the gas, of sulfur trioxide in low proportion, and/or to the air or oxygen oxidation of the ammonium sulfites.

These salt solutions are treated for separate recovery of $SO_2$ and $NH_3$ contained therein.

Processes are known, wherein ammonium sulfite solutions are reacted with ammonium bisulfate to liberate sulfur dioxide and form ammonium sulfate in aqueous solution, which is thereafter subjected to thermal or catalytic decomposition, thereby separately recovering gaseous ammonia and molten ammonium bisulfate which is used to acidify the above sulfitic solutions.

This process is described, for example, in the U.S. Pat. Nos. 2,405,747, 3,321,275 and 3,676,059.

The invention concerns a process for continuously transferring the necessary amount of molten ammonium bisulfate from the ammonium sulfate conversion stage, where said ammonium bisulfate is formed, to the sulfite acidification stage.

As a matter of fact, ammonium bisulfate is present in the turbulent molten state, thus highly corrosive and hot, and it cannot be pumped out. The only discharge method is overflowing, the level in the reactor remaining then practically constant.

However, such a system, when applied to a bath under strong agitation, has the disadvantage of producing an intermittent flow.

If said ammonium bisulfate is thus passed directly to the sulfitic solution for acidification thereof, it is not possible to control the pH of the reaction mixture, which is an essential condition for obtaining a stable and complete evolution of $SO_2$.

This can be obviated by previously dissolving the molten ammonium bisulfate into water. This can be easily obtained by recovering the overflow of molten ammonium bisulfate in a water containing vessel. However the hot material, at a temperature usually higher than 250° C., most often higher than 350° C., for example 350°–450° C., flows irregularly, which results in sudden water vaporization accompanied with sudden pressure changes which are quite detrimental to the plant.

The dissolution of the bisulfate also takes place under such conditions that crystals form, which sometimes result in the plugging of the ducts.

Furthermore, for all these reasons, the concentration of the recovered aqueous solution is variable, which results in difficulties in controlling the pH in the acidification step.

The process of the invention overcomes these disadvantages. It is so characterized that the molten ammonium bisulfate, before being passed to the acidification step, is admixed with a stream of aqueous ammonium bisulfate solution.

According to a preferred embodiment, molten ammonium bisulfate, when overflowing from the reactor designed to convert ammonium sulfate to bisulfate is recovered in a stream of aqueous ammonium bisulfate solution, and the concentration is adjusted by water addition. This aqueous stream is preferably discharged from a tank and the regulating solution is fed back to the tank which is also fed with water to maintain a constant concentration of ammonium bisulfate in the circulated solution. The amount of solution necessary for the acidification step is also taken from this circuit.

The concentration control may be effected, for example, by measuring the specific gravity.

It has been observed that this process overcomes the above disadvantages, provided the ratio by weight of the recirculated ammonium bisulfate solution to the molten ammonium bisulfate, when contacting these two components, is higher than 5 and preferably from 10 to 100 as an average. The ammonium bisulfate concentration of the recirculated solution is usefully selected between 10 and 80% b.w., and preferably between 20 ad 70% b.w.

The temperature of the circulated solution may be selected between 20° C. and the boiling temperature under the prevailing pressure, for example 100° C. or beyond, without disadvantage; it is usually about 60° to 80° C.

The presence of a tank in the bisulfate dissolution loop permits variations in the overflow rate to be dampened. It is thus possible to obtain an aqueous bisulfate solution of stable concentration which can be easily supplied to the sulfite acidification reactor where the pH can then be easily controlled.

In the above description, the process has been defined as utilizing molten ammonium bisulfate. It is intended that this bisulfate may contain a proportion of unconverted ammonium sulfate. The exact composition of the bath depends widely on its temperature.

The drawing is a schematic flowsheet wherein the process of this invention is illustrated in the following example.

EXAMPLE

A plant for purifying a stack-gas containing $SO_2$ and $SO_3$ as impurities, by means of an ammonia solution, produces 0.46 m³/hour of an aqueous solution containing:

0.68 kmole/h of $NH_4HSO_3$
0.32 kmole/h of $(NH_4)_2SO_3$
0.35 kmole/h of $(NH_4)_2SO_4$.

This solution is supplied through duct 1 to an acidification reactor 2 also receiving, through line 3, an aqueous solution containing:

1.35 kmole/h of $NH_4HSO_4$, and
0.1 kmole/h of $(NH_4)_2SO_4$.

The temperature in this reactor is about 40° C.

Air is fed to the bottom of the reactor, through line 4, in order to facilitate the stripping of $SO_2$, and there is discharged through line 5 an effluent gas containing 1 kmole/h of $SO_2$; instead of air, an inert gas may be used, for example nitrogen.

The residual aqueous solution discharged from the reactor through line 6 contains:

0.03 kmole/h $NH_4HSO_4$
1.77 kmole/h of $(NH_4)_2SO_4$.

It is supplied to a reactor 7 for the decomposition of the ammonium sulfates, which is heated to a temperature of about 375° C. by direct contact with hot combustion gas from a burner. An effluent gas carrying:

1.92 kmole/h of $NH_3$
0.15 kmole/h of $SO_2$ 0.20 kmole/h of $SO_3$
is discharged through line 8.

The reactor is of the constant level type and is operated by overflowing. 170 kg/h of molten salts are obtained through duct 9. They contain as an average:

1.35 kmole/h of $NH_4HSO_4$ and
0.1 kmole/h of $(NH_4)_2SO_4$.

This stream is admixed at the temperature of 70°–80° C. with an aqueous solution of $NH_4HSO_4$, which is supplied from a tank 11 through line 10. The salt solution is fed back through line 12 to the tank.

1,900 kg/h of solution is supplied through line 10 and additional water supplied through line 13 helps to maintain the concentration of the circulated solution at about 65% b.w. of salts.

The acidification reactor 2 is fed through line 3 by pumping a fraction of this solution.

With such a device, it is observed that the dissolution of the molten salts discharged from reactor 7 takes place easily, without any sudden pressure changes being observed in the plant, and it is easy to control the pH of the reaction mixture in reactor 2.

What we claim is:

1. A process for converting an ammonium sulfite solution to sulfur dioxide, which comprises the continuous steps of:
    (a) reacting said ammonium sulfite solution with a stream of an aqueous ammonium bisulfate solution as defined in step (d), in order to evolve sulfur dioxide and convert the ammonium bisulfate in said solution to ammonium sulfate,
    (b) discharging said evolved sulfur dioxide,
    (c) decomposing said ammonium sulfate by heating to gaseous ammonia and molten ammonium bisulfate, discharging said gaseous ammonia, and overflowing said molten ammonium bisulfate,
    (d) maintaining an aqueous ammonium bisulfate solution in a reserve tank and passing a first fraction thereof to step (a) as said stream of an aqueous ammonium bisulfate solution and a second fraction thereof to a mixing zone,
    (e) admixing the overflowed molten ammonium bisulfate of step (c) with the second fraction of step (d) in said mixing zone and recycling the resultant mixture to said reserve tank, the ratio by weight of said second fraction to said overflowed molten ammonium bisulfate in said mixing zone being higher than 5:1
    (f) adding water to the aqueous ammonium bisulfate solution in order to maintain a substantially constant ammonium bisulfate concentration in said mixing zone and so as to compensate for the supply of molten ammonium bisulfate to the mixing zone.

2. A process according to claim 1, wherein the ammonium sulfate is decomposed to ammonia and ammonium bisulfate by heating to 250°–450° C.

3. A process according to claim 2, wherein the ammonium sulfate is heated by passing hot gas therethrough.

4. A process according to claim 1, wherein the ratio by weight of said second fraction to the overflowed molten ammonium bisulfate supplied to the mixing zone is from 10:1 to 100:1.

5. A process according to claim 1, wherein the substantially constant ammonium bisulfate concentration is from 10 to 80% b.w.

6. A process according to claim 1, wherein the substantially constant ammonium bisulfate concentration is from 20 to 70% b.w.

7. A process according to claim 1, wherein a stripping gas is passed through the ammonium sulfite solution in step (a).

8. A process according to claim 1, wherein the temperature in the mixing zone is about 60°–80° C.

* * * * *